United States Patent
Rustad et al.

(10) Patent No.: US 6,643,717 B1
(45) Date of Patent: Nov. 4, 2003

(54) FLOW CONTROL

(75) Inventors: Mark D. Rustad, Edina, MN (US); Scott A. Davidson, Savage, MN (US); Jeffrey T. Rabe, Minnetonka, MN (US); Robert J. Lipe, Franklin, TN (US); Steven R. Wahl, Chanhassen, MN (US)

(73) Assignee: Digi International Inc., Minnetonka, MN (US)

( * ) Notice: Subject to any disclaimer, the term of this patent is extended or adjusted under 35 U.S.C. 154(b) by 0 days.

(21) Appl. No.: 09/437,413

(22) Filed: Nov. 10, 1999

(51) Int. Cl.[7] .............................................. G06F 13/14
(52) U.S. Cl. ..................... 710/32; 709/232; 709/237; 375/340; 375/368
(58) Field of Search ........................... 710/32; 709/232, 709/237; 375/340, 368

(56) References Cited

U.S. PATENT DOCUMENTS

| | | | |
|---|---|---|---|
| 3,845,474 A | 10/1974 | Lange et al. ............. 340/172.5 |
| 4,035,777 A | 7/1977 | Moreton ..................... 364/200 |
| 4,151,592 A | 4/1979 | Suzuki et al. ................ 364/200 |
| 4,774,625 A | 9/1988 | Yamanaka ................... 710/110 |
| 5,353,338 A | * 10/1994 | Nakano et al. ............... 379/99 |
| 5,371,858 A | * 12/1994 | Miller et al. ................ 395/275 |
| 5,452,432 A | 9/1995 | Macachor .................... 710/22 |
| 5,459,754 A | * 10/1995 | Newby et al. ............... 375/368 |
| 5,497,501 A | 3/1996 | Kohzono et al. ............. 710/29 |
| 5,561,816 A | 10/1996 | Mitsuhira et al. ............. 710/22 |
| 5,613,153 A | 3/1997 | Arimilli et al. ............. 395/821 |
| 5,694,575 A | 12/1997 | Oba et al. ................... 395/473 |
| 5,734,684 A | * 3/1998 | Matsui ....................... 375/340 |
| 5,761,453 A | 6/1998 | Anderson et al. ........... 710/308 |
| 5,991,831 A | 11/1999 | Lee et al. .................... 710/33 |
| 6,029,202 A | * 2/2000 | Frazier et al. .............. 709/232 |
| 6,058,474 A | 5/2000 | Baltz et al. .................... 713/1 |
| 6,105,086 A | 8/2000 | Doolittle et al. ............. 710/52 |
| 6,134,607 A | 10/2000 | Frink .......................... 710/22 |
| 6,298,396 B1 | 10/2001 | Loyer et al. ................. 710/22 |

FOREIGN PATENT DOCUMENTS

EP 0563621 10/1993 ........... G06F/11/00

OTHER PUBLICATIONS

"MC68030 Enhanced 32-Bit Microprocessor User's Manual, 3rd Edition", Section 6, *Published by Motorola*, (1992).
"PowerPC 601 RISC Microprocessor User's Manual", Chapter 4; Sections 4.7.2 through 4.7.9, *Available from IBM and Motorola*.
"TinyRISC TR4101 Building Blocks Technical Manual", Published by LSI Logic, (Jan. 2000).
"TinyRISC TR4101 Microprocessor Core Technical Manual", Published by LSI Logic, (Dec. 1999).
Tanenbaum, Andrew S., "Operating Systems: Design and Implementation", *Section 2.2.3: Mutual Exclusion with Busy Waiting*, Prentice–Hall, Inc., Englewood Cliffs, New Jersey, pp. 53–57, (1987).

* cited by examiner

*Primary Examiner*—Jeffrey Gaffin
*Assistant Examiner*—Abdelmoniem Elamin
(74) *Attorney, Agent, or Firm*—Schwegman, Lundberg, Woessner & Kluth, P.A.

(57) ABSTRACT

A method for controlling a transmitter for a serial data port is provided. The method includes receiving a set of data at the serial data port. The data in the set of data is compared with a selected pattern of bits. When data in the set of data matches the selected pattern of bits, a bit in a register is set. When the bit in the register is set, transmissions stop. The method further includes processing the set of data to determine a flow control state. When processing the set of data determines that the flow control state is a first state, transmissions re-start.

20 Claims, 3 Drawing Sheets

FLOW CONTROL

CROSS REFERENCE TO RELATED APPLICATIONS

The present application is related to the following co-pending application: U.S. Ser. No. 09/437,675 (the '026 Application), entitled "CHARACTER COUNTER AND MATCH REGISTERS IN A SERIAL INTERFACE" and filed on the same day as the present application. The '026 Application is incorporated herein by reference.

TECHNICAL FIELD OF THE INVENTION

The present invention relates generally to the field of telecommunications and, in particular, to flow control in telecommunications circuits.

BACKGROUND

In recent years, computers have become a commonplace part of life for large segments of society. Many businesses and other groups or institutions rely on vast networks of computers to share data among large numbers of users. To communicate with each other, these computers and other network devices generate serial data streams that are communicated over some medium such as a telephone line, local area network or other appropriate medium.

A serial data stream can include data as well as commands that control the communication between end stations. This is referred to as "in-band communication." These commands are typically transmitted over the same transmission medium as the data and, in fact, look just like regular data. Thus, the end stations must be able to distinguish between two modes of communication: a command mode and a data mode. Data that is not intended as a command but that could be interpreted as a command is typically preceded by a signal indicating that the communication is transitioning between command and data modes.

Commands can be used for in-band "flow control" in the serial communication between end stations. In-band flow control relates to controlling the transmission and receipt of data over a serial communication link. In-band flow control is typically used with asynchronous data ports. One command that is typically provided in command mode is the "XOFF" command or its equivalent. This command allows one end station to instruct the other end station to cease transmitting data over the serial communication link.

The speed and accuracy with which an end station responds to the XOFF command provides competing concerns for system designers. For example, some systems respond quickly to anything in the data path that looks like an XOFF command. Unfortunately, this can result in an unwanted interruption in the communication link when data is mistakenly interpreted as an XOFF command. Alternatively, some systems use procedures to assure that data that matches the XOFF command was sent in command mode before responding to the command. At today's ever increasing data rates, this can result in data loss and other problems due to the time delay in processing the data to interpret the command.

For the reasons stated above, and for other reasons stated below which will become apparent to those skilled in the art upon reading and understanding the present specification, there is a need in the art for improved flow control for a serial communication link.

SUMMARY

The above mentioned problems with flow control and other problems are addressed by the present invention and will be understood by reading and studying the following specification. Systems and methods are described that use a combination of hardware and software to set and reset a bit in a register to control the transmission of data from a serial port. Essentially, the hardware aspect allows the system to quickly stop transmission when a bit sequence matches a stop command and the software aspect allows the data stream to be checked to determine whether the matched bit sequence was received in command mode. Advantageously, this allows transmissions to be stopped in as little as one character time. If transmissions were inadvertently stopped, the software quickly restarts transmissions.

In one embodiment, a method for controlling a transmitter for a serial data port is provided. The method includes receiving a set of data at the serial data port. The data in the set of data is compared with a selected pattern of bits. When data in the set of data matches the selected pattern of bits, a bit in a register is set. When the bit in the register is set, transmissions stop. The method further includes processing the set of data to determine a flow control state. When processing the set of data determines that the flow control state is a first state, transmissions re-start.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

Figure 1:
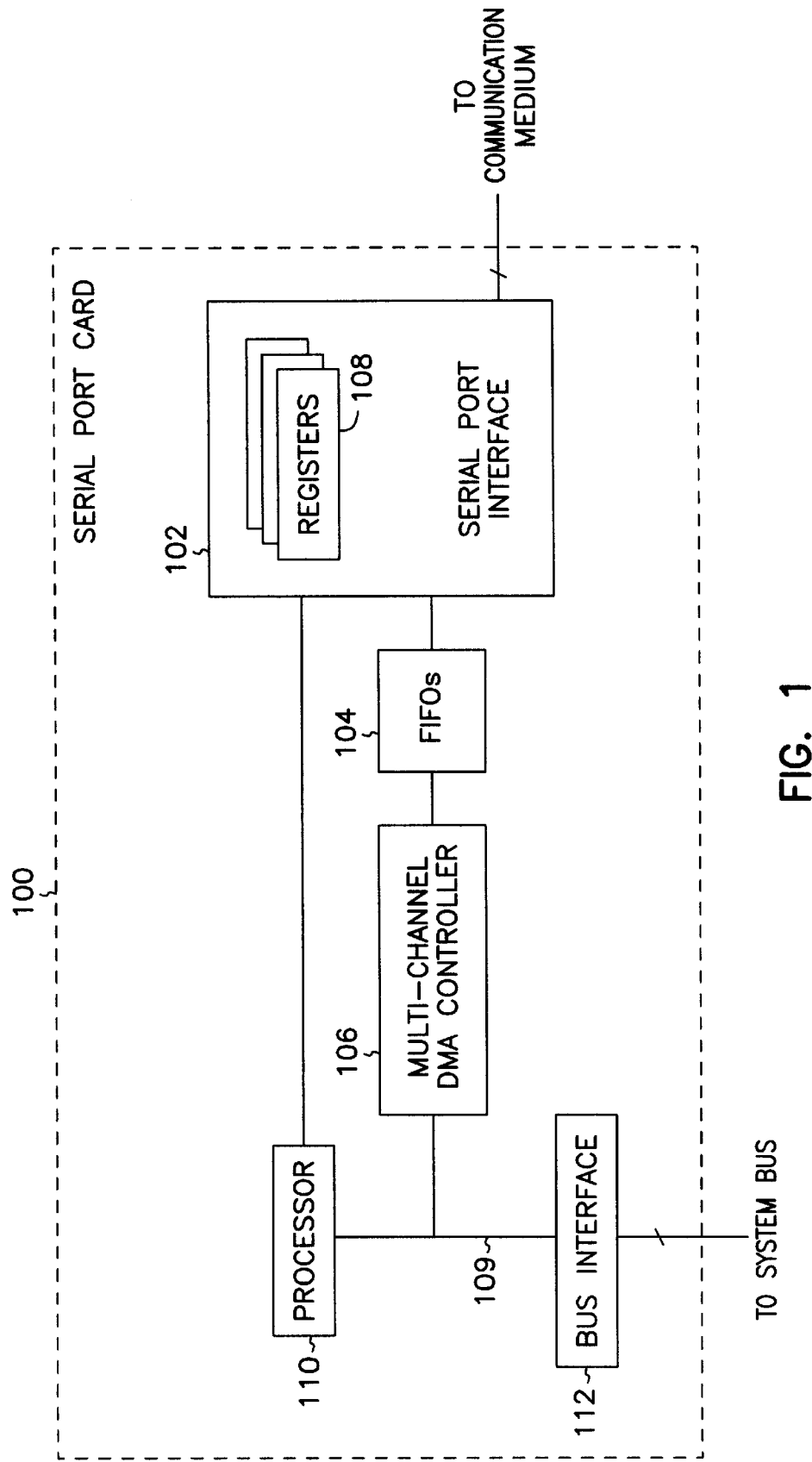
FIG. 1 is a block diagram of one embodiment of a serial port card constructed according to the teachings of the present invention.

FIG. 1 is a block diagram of one embodiment of a serial port card, indicated generally at 100, and constructed according to the teachings of the present invention. Card 100 includes serial port interface 102 that provides an interface for a plurality of serial ports. In one embodiment, serial port interface 102 provides an interface for up to 12 serial ports in synchronous mode or up to 9 serial ports in asynchronous mode. Serial port interface 102 is coupled to first-in-first-out (FIFO) buffers 104. FIFOs 104 store data temporarily for multichannel direct memory access (DMA) controller 106. DMA controller 106 is coupled to local bus 109. Local bus 109 couples processor 110 to DMA controller 106 and bus interface 112. Bus interface 112 comprises, for example, a peripheral component interconnect (PCI) bus interface so that card 100 can be plugged into a computer that supports the PCI standard. In other embodiments, other appropriate bus interfaces can be provided.

Serial port interface 102 also includes registers 108. Registers 108 each include at least one bit position that is used for flow control for an associated serial port. For example, in one embodiment, registers 108 comprise status registers that include designated bits that indicate when specified characters are stored in one of FIFOs 104. These bits are set as specified in the '026 Application.

When the bit used for flow control is set, it indicates that the associated serial port has received data that may be a command to cease transmissions. This bit can be set under hardware or software control. As data is received at the serial port, the bit is set whenever a group of bits matches a selected pattern. In response to setting the bit, transmissions for the associated serial port are terminated. Advantageously, by performing this operation under hardware control, it is possible to stop transmissions within one character time.

The flow control bit in registers 108 can be reset by software or firmware running on processor 110 when it is determined that the bit was improperly set. For example, the bit may have been set when the serial communication system received data in data mode that is equivalent to the "XOFF" command. In this case, the software can analyze the data stream to determine if the data was not intended as a command. If the data was not intended as a command, the software can reset the bit in register 108 and thus restart transmissions on the affected serial port.

Advantageously, serial port card 100 uses a combination of hardware and software flow control to provide a combination of quick response to apparent flow control commands and quick correction when non-command data is mistaken for command data. In one embodiment, this combination of software and hardware flow control is used for asynchronous serial ports of serial port card 100. In other embodiments, this hardware and software flow control can be used with other appropriate communication methods.

Figure 2:
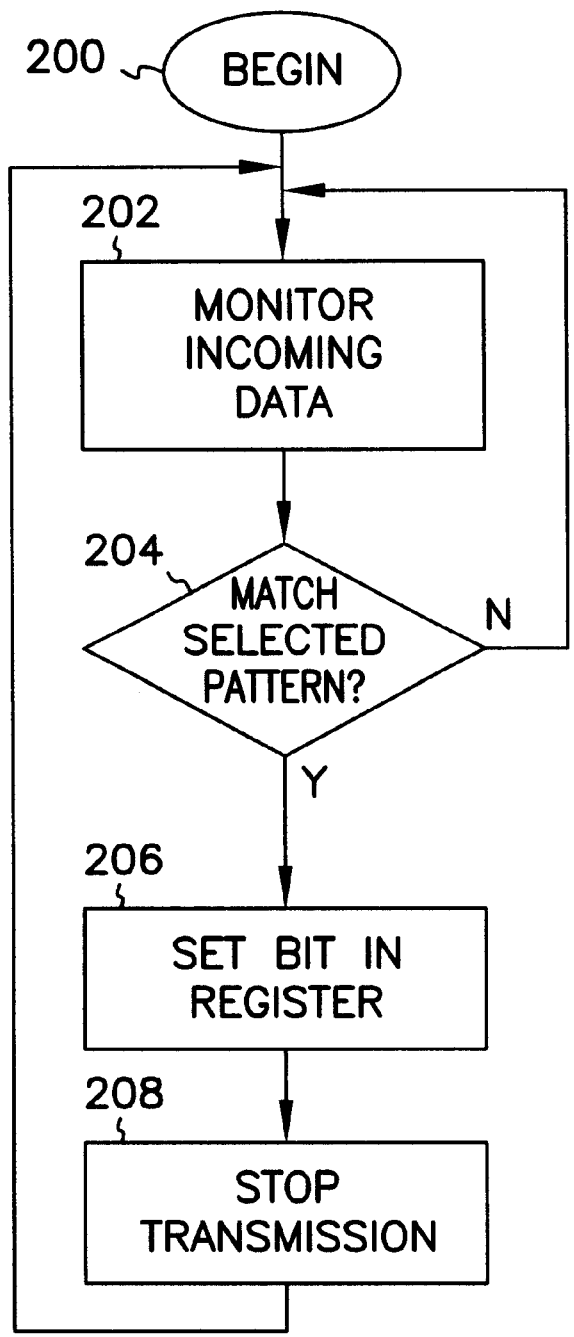
FIG. 2 is a flow chart that illustrates an embodiment of a process for one aspect of flow control according to the teachings of the present invention.

FIG. 2 is a flow chart that illustrates an embodiment of a process for one aspect of flow control for a serial link according to the teachings of the present invention. This aspect of the process or method relates to the hardware side of the flow control process. Essentially, on the hardware side a bit in a register associated with the serial link is set when a group of bits received on the serial link matches a selected bit pattern.

The method begins at block 200. At block 202, the method monitors incoming data on the serial link for bits that match a selected bit pattern corresponding to a selected command, e.g., the "XOFF" command or its equivalent. For example, in one embodiment, the method uses the character matching technique described in the '026 Application to identify groups of bits that match the selected bit pattern. It is understood that other techniques can be used to detect a match between data in the data stream on the serial link and the selected command.

When a match is detected at block 204, the method proceeds to set a bit in a hardware register at block 206. If the group of bits does not match the selected bit pattern the method returns to block 202 and continues to monitor the bit stream.

At block 208, the method takes action based on the set bit. In one embodiment, the method stops transmitting data over the serial link when the bit is set. The method returns to block 202 and continues to monitor the incoming data.

The method of FIG. 2 can terminate in one of at least two ways. First, the method ends if the port that is being monitored is closed. Second, the method ends if the port that is being monitored is reconfigured to not use in-band flow control.

Figure 3:
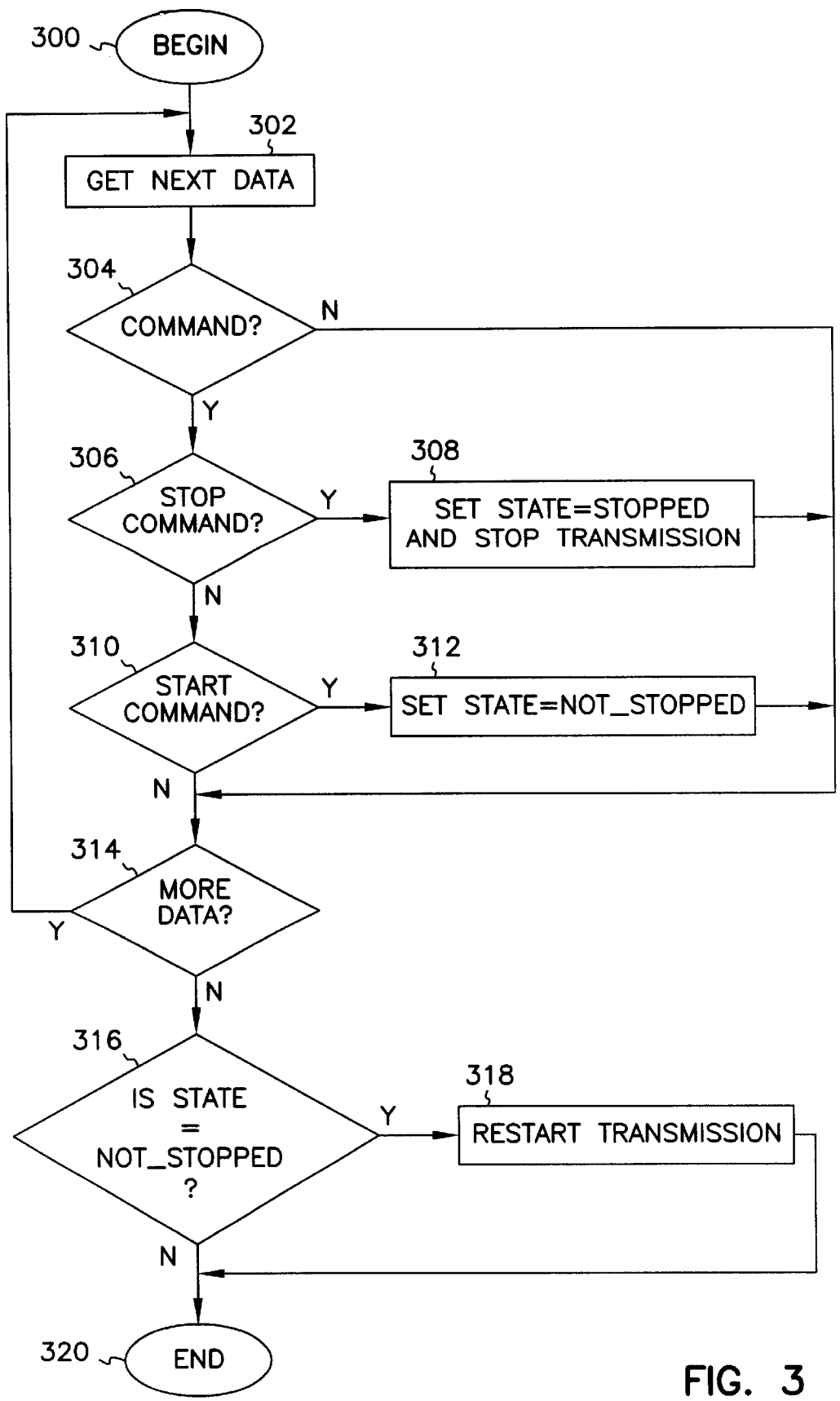
FIG. 3 is a flow chart that illustrates an embodiment of a process for another aspect of flow control according to the teachings of the present invention.

FIG. 3 is a flow chart that illustrates an embodiment of a process for another aspect of flow control according to the teachings of the present invention. This aspect of the process or method relates to the software or firmware side of the flow control process. Essentially, on the software side the process filters the data stream to determine whether transmission was properly suspended. In other words, the software side processes the data stream to determine the actual flow control state of for the serial port based on a received set of data or characters.

The method begins at block 300. This method is invoked and processed for each set of data received by the serial port. At block 302, the method gets the next data in the set of data, e.g., the next character. At block 304, the method determines whether the data is a command or data. For example, the method determines whether the data was preceded by a character that indicates that the next character should be treated as a literal (data) character, e.g., the "LNEXT" command for UNIX systems.

If, at block 304, the data was not a command, the method proceeds to block 314.

If, at block 304, the data was a command, then the method proceeds to block 306 to determine the effect, if any, that the command has on the flow control state. At block 306, the method determines whether the command is a stop command. If it is a stop command, the method proceeds to block 308 and sets a STATE variable to a STOPPED state. The method then proceeds to block 314.

If, at block 306, the method determines that the command is not a stop command, then the method proceeds to block 310 and determines whether the command is a start command. If so, the method proceeds to block 312 and sets the STATE variable to a NOT_STOPPED state.

If, at block 310, the method determines that the command is not a start command, then the method proceeds to block 314. At block 314, the method determines whether there is additional data. If so, the method returns to block 302 and processes the next data. If not, then the method proceeds to block 316.

At block 316, the method determines the current flow control state for the serial port based on the state of the STATE variable. If the STATE variable indicates a STOPPED state, then the method ends at block 320. If the STATE variable indicates a NOT_STOPPED state, then the method restarts transmissions at block 318 and ends at block 320.

CONCLUSION

Systems and methods have been described that use a combination of hardware and software to set and reset a bit in a register to control the transmission of data from a serial port. Essentially, the hardware aspect allows the system to quickly stop transmission when a bit sequence matches a stop command and the software aspect allows the data stream to be checked to determine the actual flow control state for the serial port. Advantageously, this allows transmissions to be stopped in as little as one character time. If transmissions were inadvertently stopped, the software quickly restarts transmissions.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, this technique can be used with any number of serial ports. Further, the claimed invention is not limited to use with the "XOFF" command. Other commands that affect flow control can also be handled under the combination of software and hardware control.

What is claimed is:

1. A method for controlling transmissions from a serial data port, the method comprising:

receiving a set of data at the serial data port;

comparing data in the set of data with a selected pattern of bits;

when data in the set of data matches the selected pattern of bits, setting a bit in a register;

when the bit in the register is set, stopping transmissions from the serial data port;

processing the set of data to determine a flow control state; and when processing the set of data determines that the flow control state is a first state, restarting transmissions.

2. The method of claim 1, wherein comparing data in the set of data comprises comparing data in the set of data with a bit pattern for an "XOFF" command.

3. The method of claim 1, wherein processing the set of data comprises analyzing the set of data with a software routine.

4. The method of claim 1, wherein processing the set of data comprises:

when data in the set of data is a stop command, setting the flow control state to a stopped state; and when data in the set of data is a start command, setting the flow control state to a not stopped state.

5. The method of claim 4, wherein transmissions are restarted when, after processing the set of data, the flow control state is in a not stopped state.

6. The method of claim 1, wherein setting a bit in a register comprise setting a bit in a status register that identifies when selected characters are found in a buffer for the data stream.

7. A method for controlling transmissions from a serial port, the method comprising:

stopping transmission when a selected bit in a register is set based on a character match in a set of data received at the serial port;

determining a flow control state for the serial port based on the received set of data with a software routine running on a processor; and when the flow control state is a first state, overriding the effect of the register.

8. The method of claim 7, wherein stopping transmission comprises stopping transmission when the set of data contains a character that matches an "XOFF" command.

9. The method of claim 7, wherein overriding the effect of the register comprises resetting the bit and restarting transmissions.

10. The method of claim 7, wherein stopping transmission comprises stopping transmission when a selected bit in a status register is set.

11. The method of claim 7, and further comprising setting the bit in the register when a character in the set of data matches a selected pattern.

12. The method of claim 7, wherein determining a flow control state comprises:

when data in the set of data is a stop command, setting the flow control state to a stopped state; and when data in the set of data is a start command, setting the flow control state to a not stopped state.

13. A serial port card, comprising:

a serial port interface for at least one serial port;

at least one register including at least one bit place that is operable to be set based on a character match in a received set of data received at the at least one serial port, wherein transmissions for the serial port stop when the bit is set; and a processor communicatively coupled to the serial port interface and the register that includes a software routine that determines a flow control state for the at least one serial port based on the set of data and that overrides the effect of the register when the flow control state is a first state.

14. The serial port card of claim 13, wherein the serial port interface comprises a number of asynchronous serial ports.

15. The serial port card of claim 13, wherein the serial port interface comprises a number of ports that are configurable as synchronous or asynchronous serial ports.

16. The serial port card of claim 13, wherein the at least one register comprises at least one status register for each port of the serial port interface.

17. The serial port card of claim 13, wherein the at least one bit place indicates whether a character that matches a command to stop transmitting has been received.

18. The serial port card of claim 13, wherein the serial port interface creates status data, including data for the bit place in the register corresponding to a flow control command, when a specified amount of data is placed into a buffer.

19. The serial port card of claim 13, and further including a bus interface communicatively coupled to the processor.

20. The serial port card of claim 19, wherein the bus interface comprises a peripheral component interconnect (PCI) bus interface.

* * * * *